US010038503B2

(12) United States Patent
Lesea et al.

(10) Patent No.: US 10,038,503 B2
(45) Date of Patent: Jul. 31, 2018

(54) ADAPTIVE OPTICAL CHANNEL COMPENSATION

(71) Applicant: Xilinx, Inc., San Jose, CA (US)

(72) Inventors: Austin H. Lesea, Los Gatos, CA (US); Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 220 days.

(21) Appl. No.: 14/459,070

(22) Filed: Aug. 13, 2014

(65) Prior Publication Data

US 2016/0050017 A1    Feb. 18, 2016

(51) Int. Cl.
| | |
|---|---|
| H04B 10/12 | (2006.01) |
| H04B 10/00 | (2013.01) |
| H04B 10/04 | (2006.01) |
| H04B 10/2507 | (2013.01) |
| H04B 10/2575 | (2013.01) |
| H04B 10/07 | (2013.01) |
| H04B 10/58 | (2013.01) |

(52) U.S. Cl.
CPC ......... H04B 10/2507 (2013.01); H04B 10/07 (2013.01); H04B 10/2575 (2013.01); H04B 10/58 (2013.01)

(58) Field of Classification Search
CPC .............. H04B 10/616; H04B 10/2507; H04B 10/506; H04B 10/2513; H04B 10/2572; H04B 10/6161
USPC ........ 398/147, 158, 159, 162, 192, 193, 195
See application file for complete search history.

(56) References Cited

U.S. PATENT DOCUMENTS

| | | | | |
|---|---|---|---|---|
| 5,161,044 A | * | 11/1992 | Nazarathy | H04B 1/62 398/194 |
| 5,710,653 A | * | 1/1998 | Nemecek | H04B 10/5053 348/E7.094 |
| 6,178,026 B1 | * | 1/2001 | Yoshida | H04B 10/2507 398/161 |
| 6,538,789 B2 | * | 3/2003 | Sun | H04B 10/505 398/158 |

(Continued)

OTHER PUBLICATIONS

Nadaraj AH S et al: "Adaptive digital predistortion of laser diode nonlinearity for wireless applications" , Proceedings / CCECE 2003, Canadian Conference on Electrical and Computer Engineering : Toward a Caring and Humane Technology ; May 4 to 7, 2003, Montreal, Canada, IEEE, New York, NY, US, vol. 1, May 4, 2003, pp. 159-162, XP010653936.

*Primary Examiner* — David Payne
*Assistant Examiner* — Pranesh Barua
(74) *Attorney, Agent, or Firm* — W. Eric Webostad; Robert M. Brush

(57) ABSTRACT

In an adaptation module relating generally to adaptive optical channel compensation, an analysis module is coupled to receive a first data signal and a second data signal and coupled to provide first information and second information. A comparison module is coupled to compare the first information and the second information to provide third information. An adjustment module is coupled to receive the third information to provide fourth information to compensate for distortion in the second data signal with reference to the first data signal. The second data signal is associated with a conversion of the first data signal to an optical signal for communication via an optical channel.

11 Claims, 10 Drawing Sheets

(56) References Cited

U.S. PATENT DOCUMENTS

| | | | | |
|---|---|---|---|---|
| 6,687,432 B2* | 2/2004 | Schemmann | H04B 10/2507 | 385/24 |
| 6,687,466 B1* | 2/2004 | Chiappetta | H04B 10/504 | 330/149 |
| 7,058,311 B1* | 6/2006 | Islam | H04B 10/25133 | 398/140 |
| 7,313,373 B1 | 12/2007 | Lashkarian et al. | | |
| 7,382,984 B2* | 6/2008 | McNicol | H04B 10/25137 | 398/147 |
| 7,426,350 B1* | 9/2008 | Sun | H04B 10/25137 | 398/159 |
| 7,447,443 B2* | 11/2008 | Bai | H04B 10/5051 | 359/237 |
| 7,558,479 B1* | 7/2009 | Robinson | H04B 10/0795 | 398/13 |
| 7,805,082 B1* | 9/2010 | Whiteaway | H04B 10/25137 | 398/147 |
| 8,090,037 B1 | 1/2012 | Harris et al. | | |
| 8,145,066 B2* | 3/2012 | Painchaud | H03M 1/0614 | 398/192 |
| 8,909,061 B1* | 12/2014 | Varadarajan | H04B 10/6161 | 398/159 |
| 8,948,609 B2* | 2/2015 | Whiteaway | H04L 27/364 | 398/182 |
| 8,958,705 B2* | 2/2015 | Blanchette | H01S 3/06758 | 398/195 |
| 2001/0007435 A1* | 7/2001 | Ode | H03F 1/3247 | 330/149 |
| 2003/0117215 A1* | 6/2003 | O'Flaherty | H03F 1/0244 | 330/149 |
| 2003/0156779 A1 | 8/2003 | Wang et al. | | |
| 2003/0223760 A1* | 12/2003 | Takahara | H04B 10/2572 | 398/147 |
| 2004/0105684 A1* | 6/2004 | Marutani | H04B 10/2513 | 398/147 |
| 2005/0265725 A1* | 12/2005 | Okano | H04B 10/572 | 398/147 |
| 2006/0067699 A1* | 3/2006 | Chandrasekhar | H04B 10/2513 | 398/147 |
| 2006/0127100 A1* | 6/2006 | Frankel | H04B 10/29 | 398/158 |
| 2007/0223621 A1* | 9/2007 | Ahmed | H03F 1/3247 | 375/296 |
| 2008/0074186 A1* | 3/2008 | Sihlbom | H03F 1/3247 | 330/149 |
| 2008/0124076 A1 | 5/2008 | Rudolph et al. | | |
| 2008/0197925 A1* | 8/2008 | Furuta | H03F 1/3247 | 330/149 |
| 2009/0310975 A1* | 12/2009 | Shu | H04B 10/2513 | 398/147 |
| 2010/0086081 A1* | 4/2010 | Fujita | H04L 27/0008 | 375/300 |
| 2010/0303472 A1* | 12/2010 | Miller | H01S 5/06832 | 398/195 |
| 2011/0298536 A1* | 12/2011 | Okazaki | H03F 1/3247 | 330/107 |
| 2013/0183046 A1* | 7/2013 | Blanchette | H01S 3/06758 | 398/186 |
| 2013/0223849 A1* | 8/2013 | Whiteaway | H04L 27/364 | 398/141 |
| 2013/0308960 A1* | 11/2013 | Horikoshi | H03H 21/0012 | 398/209 |
| 2015/0132014 A1* | 5/2015 | Zeng | H04B 10/25133 | 398/188 |
| 2016/0036554 A1* | 2/2016 | Yasuda | H04B 10/6161 | 398/65 |

\* cited by examiner

US 10,038,503 B2

ADAPTIVE OPTICAL CHANNEL COMPENSATION

FIELD OF THE INVENTION

The following description relates to integrated circuit devices ("ICs"). More particularly, the following description relates to adaptive optical channel compensation for an IC.

BACKGROUND

Optical signaling is becoming more prevalent in communication networks. Optical fiber provides a substantial amount of bandwidth, which may be useful in addressing increasing demand for bandwidth over communication networks. However, nonlinearity of devices in an optical channel may limit use of optical channels. Accordingly, it would be desirable and useful to control for nonlinearity or other distortion in an optical channel.

SUMMARY

An apparatus relates generally to adaptive optical channel compensation. In such an apparatus, an analysis module is coupled to receive a first data signal and a second data signal and coupled to provide first information and second information. A comparison module is coupled to compare the first information and the second information to provide third information. An adjustment module is coupled to receive the third information to provide fourth information to compensate for distortion in the second data signal with reference to the first data signal. The second data signal is associated with a conversion of the first data signal to an optical signal for communication via an optical channel.

A system relates generally to adaptive compensation for an optical channel. Such a system includes an adaptation module coupled to a modulator. In such a system, a shaping filter is coupled to the modulator. A first signal converter is coupled to the shaping filter. A second signal converter is coupled to the first signal converter. The modulator and the adaptation module are coupled to receive a first data signal. The modulator, the shaping filter, the first signal converter, the second signal converter, and the adaptation module are coupled in a feedback loop. The feedback loop is coupled to provide a second data signal via the second signal converter after output from the first signal converter for input to the adaptation module. The second data signal is a version of the first data signal. The adaptation module is coupled to provide adjustment information to at least one of the shaping filter or the modulator to compensate for distortion in the second data signal with reference to the first data signal.

A method relates generally to distortion compensation. In such a method, a first data signal and a second data signal are received by an analysis module of an optical transmitter. The second data signal is a feedback associated with the first data signal. The analysis module generates first information for the first data signal and second information for the second data signal. A comparison module compares the first information and the second information to provide third information. An adjustment module receives the third information to provide fourth information to compensate for distortion in the second data signal with reference to the first data signal.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2 is a simplified block diagram depicting an exemplary columnar Field Programmable Gate Array ("FPGA") architecture.

FIG. 3-1 is a block diagram depicting an exemplary optical transmitter.

FIG. 3-2 is a block diagram depicting the exemplary optical transmitter of FIG. 3-1 with optional additional feedback control loops.

FIG. 3-3 is a block diagram depicting an exemplary optical transmitter with the adaptation module of FIG. 1-1 being commonly coupled.

FIG. 5-1 is a block diagram depicting an exemplary optical receiver.

FIG. 5-2 is a block diagram depicting an exemplary optical receiver with a commonly coupled adaptation module.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Nonlinearity of an optical transmitter and/or an optical receiver may negatively impact communication over an optical channel. As described below in additional detail, adaptive compensation may be used in an optical transmitter and/or an optical receiver to control against such nonlinearity and/or other distortion in an optical channel. Along those lines, such adaptive compensation may be pre-compensation adaptation, namely adjusting signaling before input to an electrical-to-optical converter for transmission, and/or such adaptive compensation may be post-compensation adaptation, namely adjusting signaling after output from an optical converter-to-electrical for reception.

Figure 1:
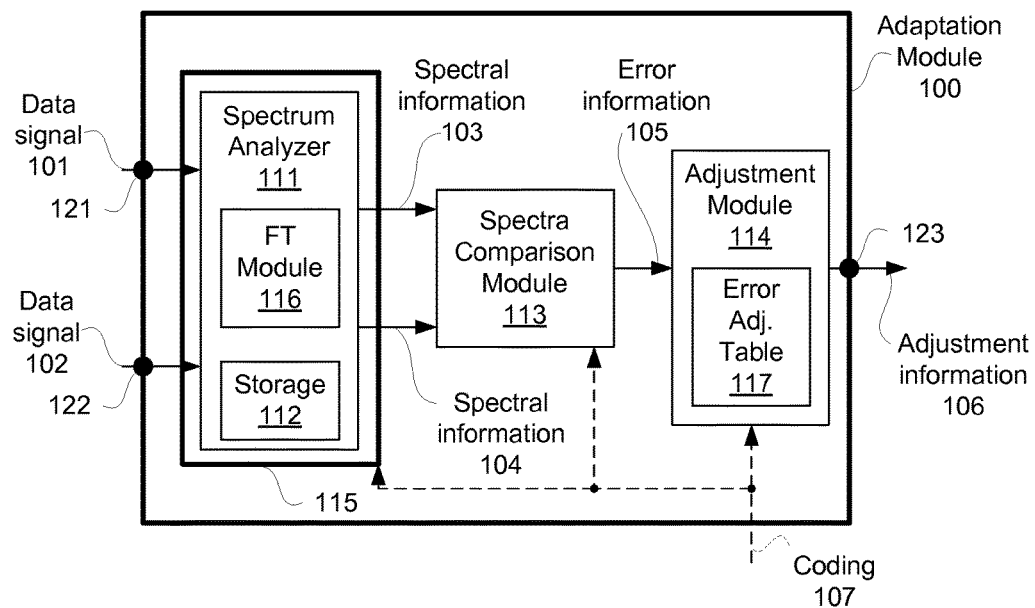
FIGS. 1-1 and 1-2 are respective block diagrams depicting respective exemplary adaptation modules for transmission.

FIG. 1-1 is a block diagram depicting an exemplary adaptation module 100 for transmission, such as for a transmitter unit or a plurality of transmitter units. Adaptation module 100 may be used for channel adaptive pre-transmission compensation ("pre-compensation") for an optical communications channel.

Adaptation module 100 may include a signal input port 121 to receive a data signal 101 to be transmitted and a signal input port 122 to receive a data signal 102, where data signal 102 may be a feedback input associated with a conversion of data signal 101 to an optical signal for transmission thereof. In another configuration described below in additional detail, data signal 101 may be a received data signal for comparison against an a priori set of information for an anticipated version of such data signal. However, for purposes of clarity by way of example and not limitation, it shall be assumed that data signal 101 is for a transmission thereof. Furthermore, a portion of a signal to be transmitted and a portion of a transmitted signal, rather than the entire signal, may be used for data signal 101 and data signal 102 respectively provided to adaptation module 100. Accordingly, data signal 101 and data signal 102 may refer to a portion or the entirety of each of those signals.

Adaptation module 100 may include an analysis module 115, such as a spectrum analysis module for example, coupled to generate spectral information 103 for data signal 101 and spectral information 104 for data signal 102. Such spectral information 103 and 104 may include one or more of amplitude information, phase information, and frequency information, including without limitation timing information associated with phase and/or frequency information. In this example, spectrum analysis module 115 includes a spectrum analyzer 111. Effectively, as data signal 102 generally represents a later incarnation of data signal 101, spectrum analyzer 111 may perform a spectral analysis on data signal 101, and then store spectral information 103 therefor in spectrum analyzer data storage 112 thereof for later use.

At a later time, spectrum analyzer 111 may perform a spectral analysis on data signal 102 to generate spectral information 104. Spectrum analyzer data storage 112 may include registers and/or memory for storing spectral information for output as spectral information 103 and 104 to spectra comparison module 113 for comparison. Spectrum analyzer 111 may include spectrum analyzer data storage 112 and at least one FT module 116 for performing one or more Fourier Transforms to obtain frequency components of data signals 101 and 102, as data signal 101 and 102 for transmission may be in a time domain. Additionally, spectrum analyzer 111 may include any of a number of other modules for obtaining other types of spectral information.

Spectral information 103 and 104 may be for any of a variety of types of coding, including without limitation quadrature-phase-shift-keying, pulse-amplitude modulation, or quadrature-amplitude modulation ("QAM"), among others. Optionally, an indication of the type of coding being used may be provided to adaptation module 100 by coding signal 107. For purposes of clarity by way of example and not limitation, it shall be assumed that data signal 101 has a 4-point constellation for a QAM configuration; however, this or other types of coding may be used, and this or other constellations may be used. Thus, for example an indication that 4 QAM is in use may be provided to any one or more of modules 113 through 115 of adaptation module 100.

Adaptation module 100 includes spectra comparison module 113 coupled to compare spectral information 103 and spectral information 104 to provide error information 105. For example, a comparison of data for a 4 QAM of data signal 101 with that of data signal 102 may reveal amplitude, phase and/or frequency differences. One, some, or all of these differences may be conveyed as error information 105 to indicate how much data signal 102 is distorted with respect to a reference data signal 101. For purposes of clarity by way of example and not limitation, it shall be assumed that phase and amplitude information is conveyed in error information 105, though in other configurations other information or groups of information may be included in error information 105.

Adaptation module 100 may include an adjustment module 114 coupled to receive error information 105 to provide adjustment information 106 at a signal output port 123. In this configuration, adjustment module 114 may include an error adjustment table 117. Error adjustment table 117 may store sets of adjustment information for output as adjustment information 106 in a tabularized format. Error information 105 may provide pointers into error adjustment table 117 to obtain settings to correct for errors indicated in error information 105, and pointed to settings may be output as adjustment information 106. Such settings may be different for different types of coding. Along those lines, coding signal 107 may be used as filter pointer to select which grouping of settings to select for output as adjustment information 106. Adjustment information 106 may compensate for one or more errors revealed by error information 105. As described below in additional detail, adjustment information 106 may be provided in various forms, including without limitation a modulation module and/or pre-compensation adaptive filter of a transmitter. In a receiver configuration such as described with reference to FIG. 6, adjustment information 106 may be provided to a post-compensation adaptive filter and/or a demodulator of a receiver.

Figures 1, 2:
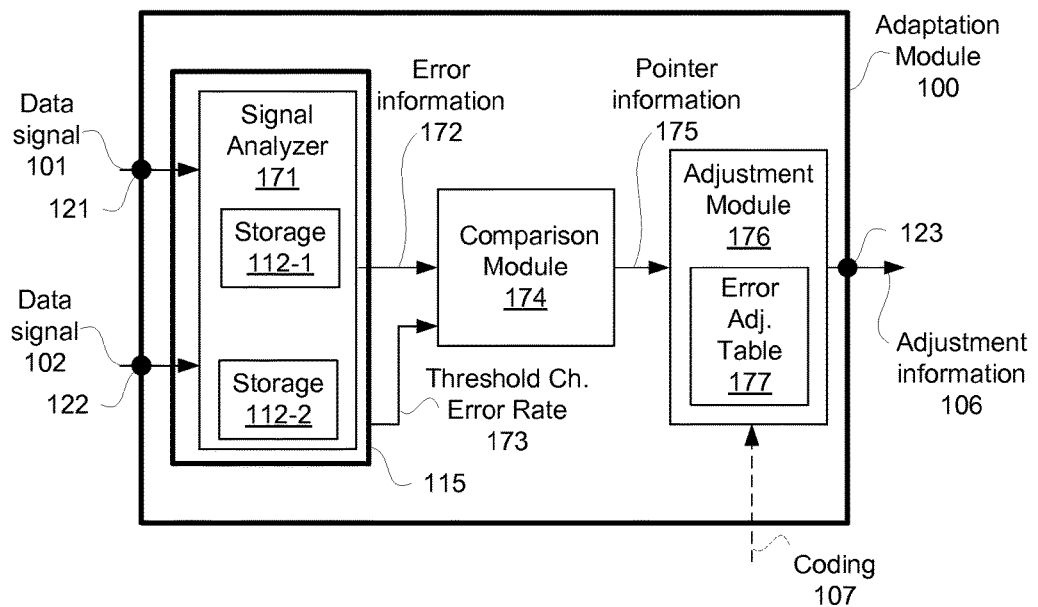
Figure 2:
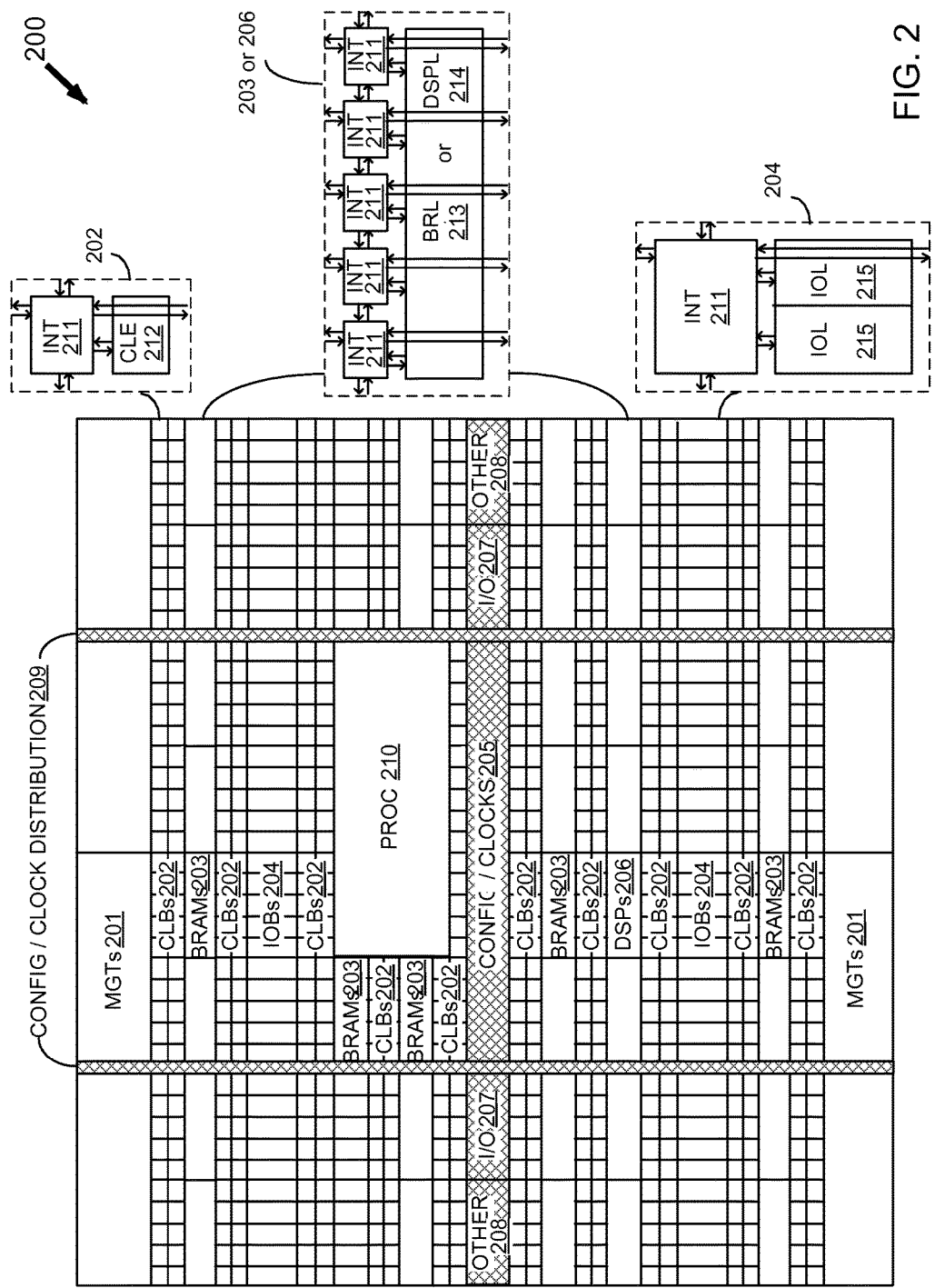

FIG. 1-2 is a block diagram depicting another exemplary adaptation module 100 for transmission, such as for a transmitter unit or a plurality of transmitter units. Adaptation module 100 may be used for channel adaptive pre-transmission compensation for an optical communications channel.

Adaptation module 100 may include a signal input port 121 to receive a priori information for a data signal 101 to be transmitted and a signal input port 122 to receive a data signal 102, where data signal 102 may be a feedback input associated with a conversion of data signal 101 to an optical signal for transmission thereof.

Adaptation module 100 may include an analysis module 115, such as a signal analysis module for example. Signal analysis module 115 may include a signal analyzer 171 having data storage 112-1 coupled to store such a priori information for data signal 101 and having data storage 112-2 coupled to store feedback signal information for data signal 102, where such feedback signal information may be more along the lines of monitoring voltage and/or current levels of data signal 102. Signal analyzer 171 need not have any spectral analysis but may be configured to generate error information 172 based on stored information in data stores 112-1 and 112-2 for data signals 101 and 102, respectively. Adaptation module 100 may further include a comparison module 174 coupled to receive error information 172, and an adjustment module 176 to provide adjustment information 106 at a signal output port 123 in response to pointer information 175.

Data stores 112-1 and 112-2 may include registers and/or memory for storing signal information for generation of error information 172 output from signal analyzer 171 to comparison module 174. For example, signal analyzer 171 may be configured to obtain an estimate of distortion, such as a receiver configured to provide an estimate of channel error rate, as error information 172. A threshold channel error rate signal 173 may be provided to comparison module 174 along with error information 172 for comparison. A source of information for threshold channel error rate signal 173 may be provided from a setting in control circuitry (not shown) or from a setting in signal analyzer 171, such as illustratively depicted. Such a comparison may result in pointer information 175 being output to adjustment module 176 to reduce channel error rate.

In this configuration, adjustment module 176 may include an error adjustment table 117. Error adjustment table 117 may store sets of adjustment information in a tabularized format for selection therefrom for output as adjustment information 106. Pointer information 175 may provide one or more pointers into error adjustment table 117 to obtain settings to correct for errors indicated in error information 172 based on comparison against a threshold of threshold channel error rate signal 173, and one or more pointed to settings may be output as adjustment information 106. Such settings may be different for different types of coding. Along those lines, optionally a coding signal 107 may be used as filter pointer to select which grouping of settings to select from in adjustment table 117 for output as adjustment information 106.

Adjustment information 106 may be used to iteratively compensate for one or more errors revealed by error information 172. Along those lines, pre-distortion responsive to adjustment information may be used for compensation to reduce a channel error rate. Such pre-distortion may be added based on a predetermined sequence, which may be a fixed rote sequence for example. A series of phase response and/or amplitude response incremental adjustments may be made using a convergence procedure, such as estimate and check iterations ultimately converging toward a threshold until an acceptable channel error rate is reached. An acceptable channel error rate may be reached when error information 172 equals or is less than a threshold value therefor as indicated by threshold channel error rate signal 173. In which event, pointer information 175 may point to a location which halts an iterative equalization training. Such iterative cycling may be re-initiated in response to error information 172 being greater than a threshold indicated by threshold channel error rate signal 173.

As described below in additional detail, adjustment information 106 may be provided in various forms, including without limitation a modulation module and/or pre-compensation adaptive filter of a transmitter. In receiver configuration, adjustment information 106 may be provided to a post-compensation adaptive filter and/or a demodulator of a receiver.

For purposes of clarity by way of example and not limitation, it shall be assumed that adjustment information 106 is obtained from an adaptation module 100 of FIG. 1-1, even though such adjustment information 106 may be sourced from adaptation module 100 of FIG. 1-2.

Adaptation module 100 may be implemented with an FPGA, a digital signal processor ("DSP"), or other signal processing device capable of being configured as described herein. With an FPGA, such an FPGA may be programmed, as well as reprogrammed, to process any of a variety of types of coding.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 2 illustrates an FPGA architecture 200 that includes a large number of different programmable tiles including multi-gigabit transceivers ("MGTs") 201, configurable logic blocks ("CLBs") 202, random access memory blocks ("BRAMs") 203, input/output blocks ("IOBs") 204, configuration and clocking logic ("CONFIG/CLOCKS") 205, digital signal processing blocks ("DSPs") 206, specialized input/output blocks ("I/O") 207 (e.g., configuration ports and clock ports), and other programmable logic 208 such as digital clock managers, analog-to-digital converters, system monitoring logic, and so forth. Some FPGAs also include dedicated processor blocks ("PROC") 210.

In some FPGAs, each programmable tile includes a programmable interconnect element ("INT") 211 having standardized connections to and from a corresponding interconnect element in each adjacent tile. Therefore, the programmable interconnect elements taken together implement the programmable interconnect structure for the illustrated FPGA. The programmable interconnect element 211 also includes the connections to and from the programmable logic element within the same tile, as shown by the examples included at the top of FIG. 2.

For example, a CLB 202 can include a configurable logic element ("CLE") 212 that can be programmed to implement user logic plus a single programmable interconnect element ("INT") 211. A BRAM 203 can include a BRAM logic element ("BRL") 213 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 206 can include a DSP logic element ("DSPL") 214 in addition to an appropriate number of programmable interconnect elements. An IOB 204 can include, for example, two instances of an input/output logic element ("IOL") 215 in addition to one instance of the programmable interconnect element 211. As will be clear to those of skill in the art, the actual I/O pads connected, for example, to the I/O logic element 215 typically are not confined to the area of the input/output logic element 215.

In the pictured embodiment, a horizontal area near the center of the die (shown in FIG. 2) is used for configuration, clock, and other control logic. Vertical columns 209 extending from this horizontal area or column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, processor block 210 spans several columns of CLBs and BRAMs.

Note that FIG. 2 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 2 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figures 1, 3:
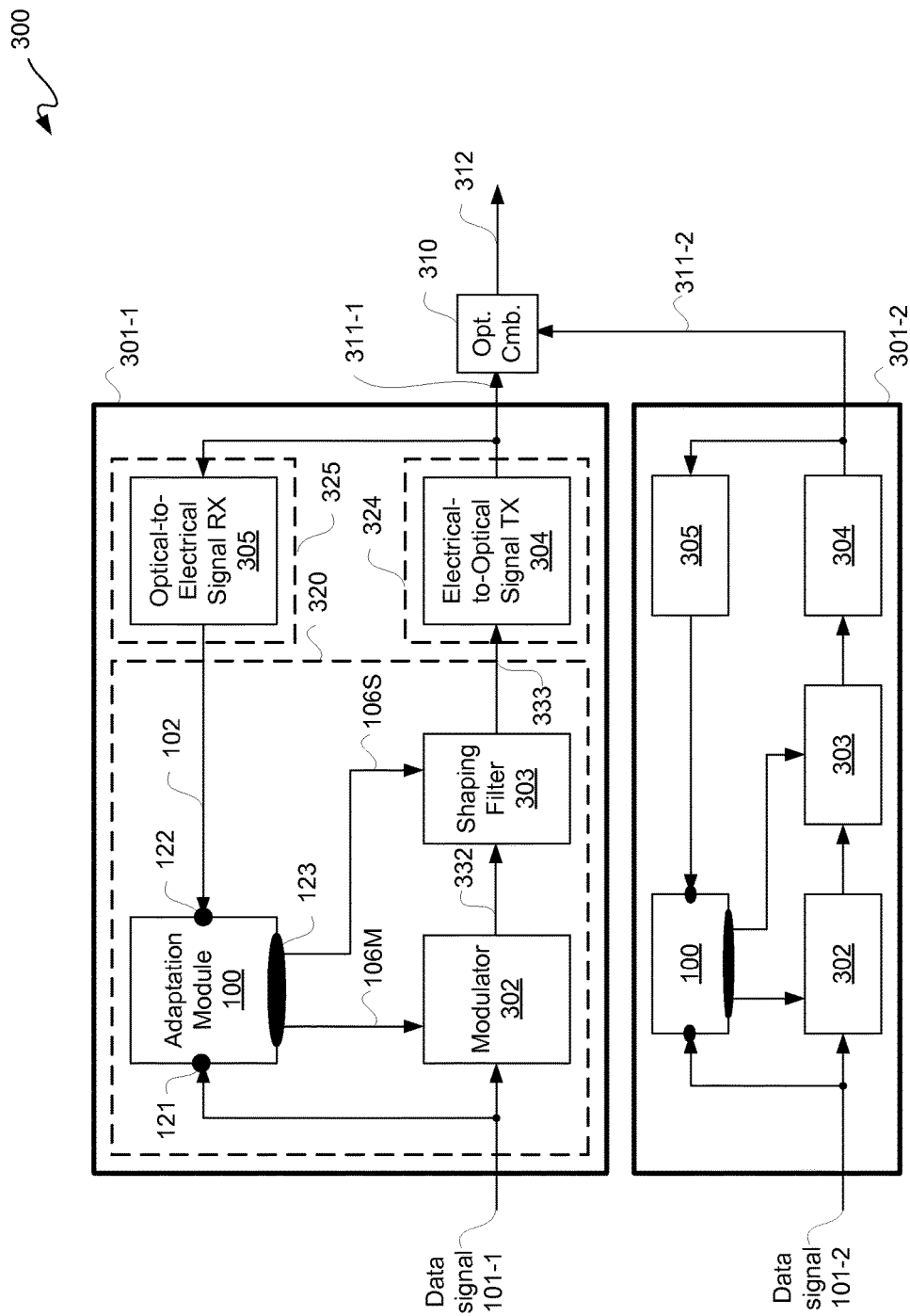
Figures 2, 3:
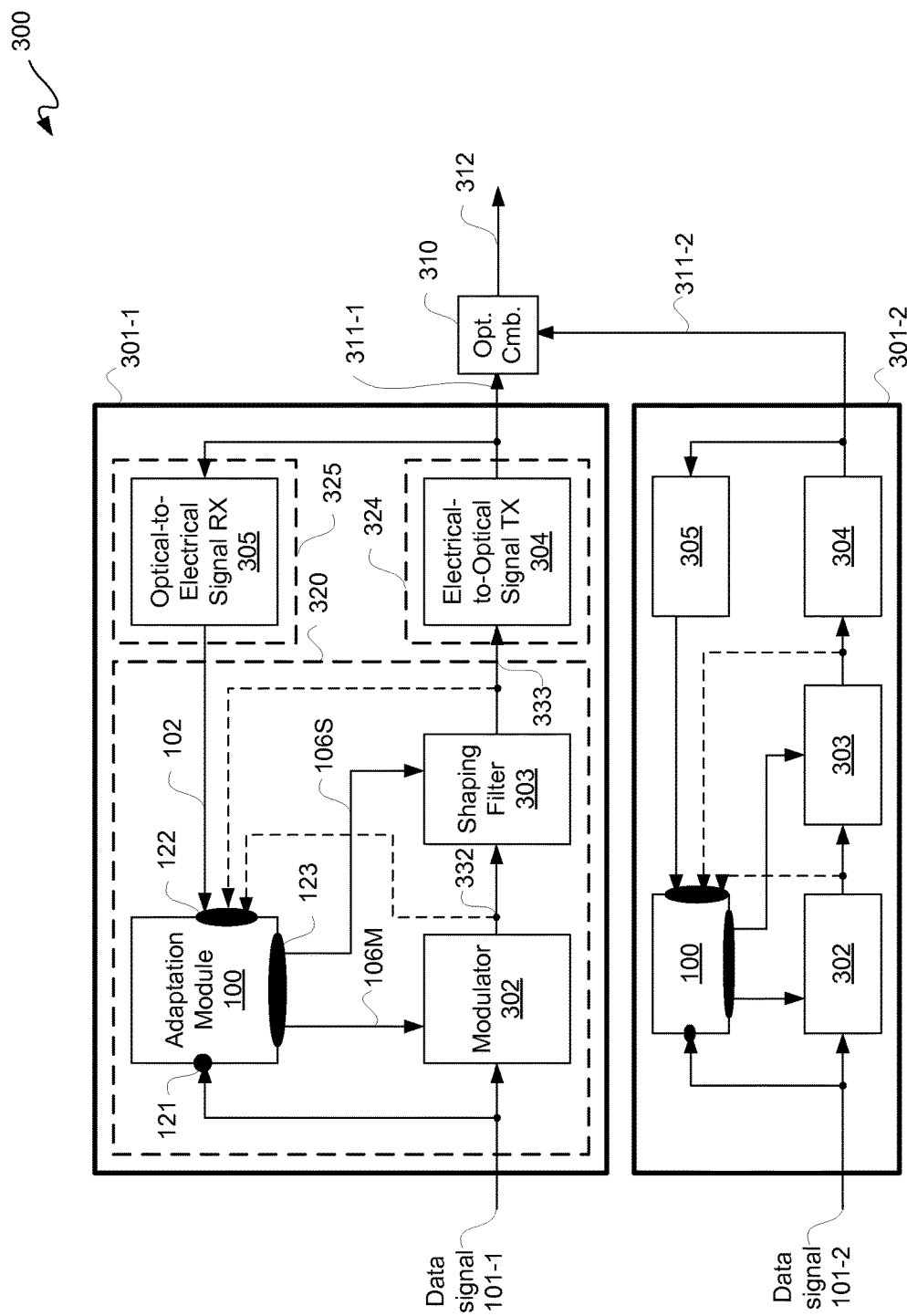
Figure 3:
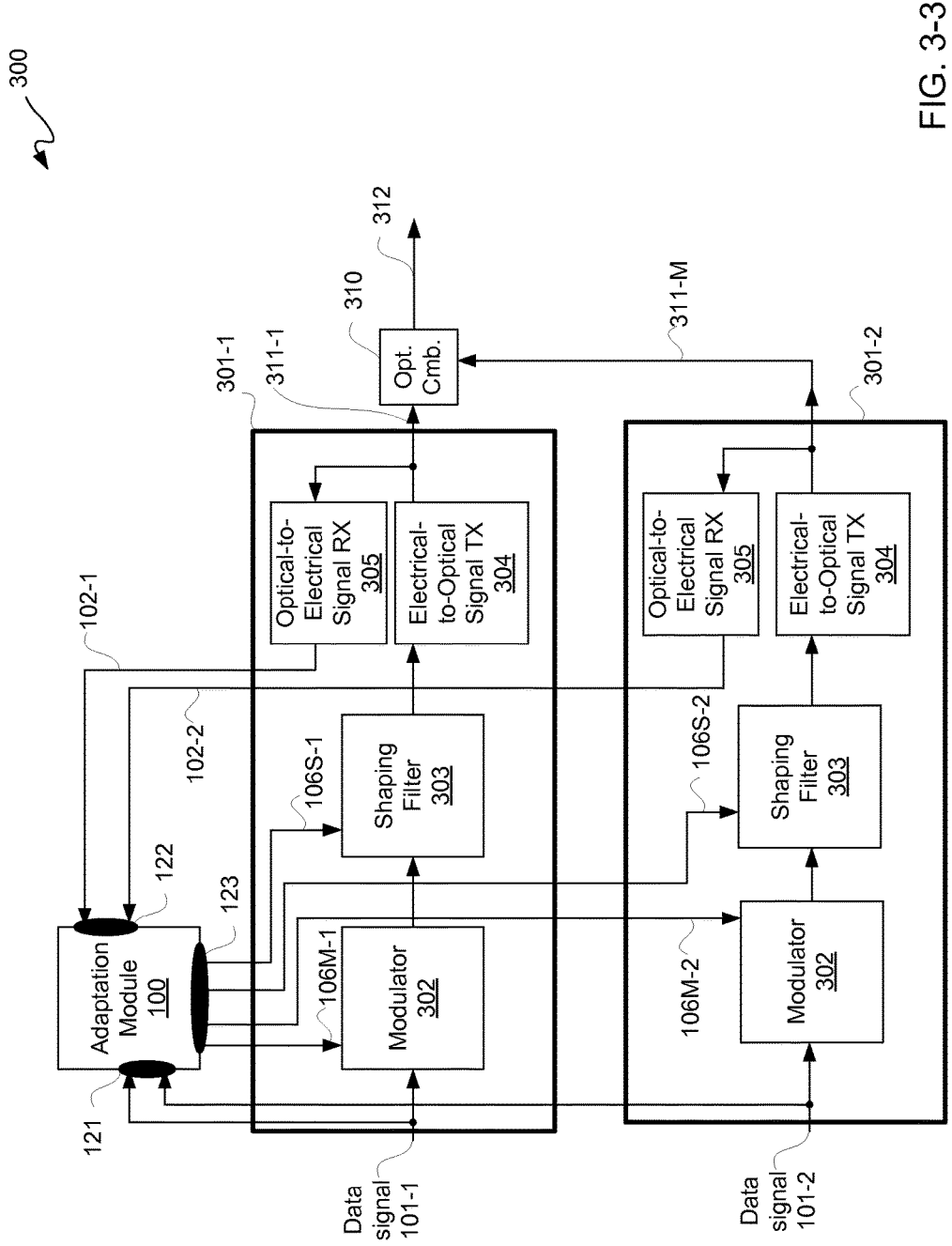

FIG. 3-1 is a block diagram depicting an exemplary optical transmitter 300. Optical transmitter 300 may have a plurality of transmitter units 301 for communication via optical channels. In this example optical transmitter has transmitter units 301-1 and 301-2. In other examples, more than two transmitter units 301 may be present. In this example, each transmitter unit 301 includes a respective adaptation module 100.

Electrical input data signals 101-1 and 101-2, which may be parallel or serial parallel inputs of a single data signal 101, may be respectively input to transmitter units 301-1 and 301-2 to obtain optical output data signals 311-1 and 311-2 respectively therefrom. Optical output data signals 311-1 and 311-2, which may represent a single output data signal 311, may be input to an optical combiner 310 to output an optical multi-waveform signal onto an optical channel 312 (hereinafter singly and collectively "optical multi-waveform signal") as an overall output of optical transmitter 300. Optical multi-waveform signal 312 may be provided to an optical transmission medium, such as a channel of an optical fiber for example, as described below in additional detail.

Each of transmitter units 301-1 and 301-2 provide their respective electrical input data signals 101-1 and 101-2 to a corresponding adaptation module 100 and a modulator 302 respectively thereof. For purposes of clarity and not limitation, transmitter unit 301-1 is further described in detail without reference to transmitter unit 301-2, as such description equally applies to both transmitter units 301.

Transmitter unit 301-1 includes a modulator 302, a shaping filter 303, an electrical-to-optical signal transmitter ("TX") 304, an optical-to-electrical signal receiver ("RX") 305, and an adaptation module 100. In an implementation, adaptation module 100, modulator 302 and shaping filter 303 may all be located on a same integrated circuit TX controller die 320, such as a same FPGA due to its programmability for example. TX 304 and RX 305 may each be formed on separate integrated circuit dies 324 and 325, respectively. However, TX die 324, RX die 325, and TX controller die 320 may all be packaged in a same package, such as for example a stacked-silicon interposer technology, where dies 320, 324, and 325 are all coupled to one another through an interposer die (not shown). Transmitter unit 301-1 may have other components, as known, which are not illustratively depicted or described herein for purposes of clarity and not limitation.

Electronic data signal 101-1 is input to signal input port 121 and to modulator 302. For purposes of clarity and not limitation, the term "port" is used broadly herein to include a single instance or multiple instances of an interface or interfaces. Modulator 302 may modulate data signal 101-1 for any type of coding, including without limitation the example of 4 QAM used herein. A 4 QAM modulated output signal 332 of data signal 101-1 may be output from modulator 302 for input to shaping filter 303.

Shaping filter 303 may be any adjustable filter. In this example, it shall be assumed that shaping filter 303 is a digital filter having adjustable coefficients and/or selectable taps. Examples of such filters may include a Finite Impulse Response ("FIR") filter and an Infinite Impulse Response ("IIR") filter having multiple taps and multiple filter coefficients, where values for filter coefficients are adjustable through signal programming. Along those lines, adaptation module 100 may output adjustment information 106S for signal input programming to shaping filter 303 to adjust filtering of a 4 QAM modulated output signal 332. Optionally, modulator 302 may be adjustable through signal programming. Along those lines, adaptation module 100 may output adjustment information 106M for signal input programming to modulator 302 to adjust modulation of data signal 101-1 to provide a 4 QAM modulated output signal 332. Either or both of adjustment information 106S and adjustment information 106M may be output via a signal output port 123 of adaptation module 100 as part of a feedback adjustment or control system of transmitter unit 301-1 to provide an adjusted, modulated and shaped electrical TX input signal 333 to electrical-to-optical signal TX 304.

Electrical-to-optical signal TX 304 converts electrical TX input signal 333 to optical output data signal 311-1. Along those lines, transmitter unit 301-1 may be configured for a first single wavelength for optical transmission, and transmission unit 301-2 may be configured for a second single wavelength for optical transmission different in wavelength than the first single wavelength. In an implementation, electrical-to-optical signal TX 304 may be a laser diode, an optical modulator, or other electrical-to-optical converter for data transmission. An example of an optical modulator that may be used is a ring modulator.

Optical output data signal 311-1 may be provided as a feedback input to optical-to-electrical signal RX 305. In an implementation, optical-to-electrical signal RX 305 may be a photo diode or other optical-to-electrical signal converter for local conversion in a closed-loop system of a transmitter unit 301 as described herein. Output of optical-to-electrical signal RX 305 may be electrical data signal 102, which may be input to signal input port 122 of adaptation module 100, as previously described.

Electronic data signal 102 may be compared with a stored version of an electrical data signal 101-1 from which electrical data signal 102 was formed. Along those lines, electrical data signal 101-1 may be a reference signal to which electrical data signal 102 is compared. For example, any and all phase differences, frequency differences, timing differences, and/or amplitude differences between data signals 101-1 and 102 may be used to provide error information, as previously described. Such error information may be used to provide adjustment information, such as adjustment information 106S and/or 106M as respective signal inputs to shaping filter 303 and/or modulator 302. Furthermore, data signal 101-1 may be a data pattern known a priori for purposes of testing and/or calibrating transmission unit 301-1.

Even though optical-to-electrical signal RX 305 is for a transmit unit 301-1 internal closed feedback loop, optical-to-electrical signal RX 305 may introduce additional error in data signal 102 with respect to a reference data signal 101-1. Accordingly, additional data points may be used to further quantify and/or qualify error information used to provide adjustment information. Along those lines, FIG. 3-2 is a block diagram depicting exemplary optical transmitter 300 of FIG. 3-1 with optional additional feedback control loops.

Modulator 302 may modulate data signal 101-1 for any type of coding, including without limitation the example of 4 QAM used herein. A 4 QAM modulated output signal 332 of data signal 101-1 may be output from modulator 302 for input to shaping filter 303, as well as for a feedback input to signal input port 122 of adaptation module 100. Adaptation module 100 may be configured to compare an a priori known stored version of data signal 101-1 after modulation for comparison with feedback of modulated output signal 332 to detect errors between them, which may be for an a priori known data pattern and a predetermined or default modulation.

Either or both of adjustment information 106S and adjustment information 106M may be output via a signal output port 123 of adaptation module 100 as part of a feedback adjustment or control system of transmitter unit 301-1 to provide an adjusted modulated and shaped electrical TX input signal 333 to electrical-to-optical signal TX 304. After or before either or both of such adjustments by adjustment information 106S and/or 106M, modulated and shaped electrical TX input signal 333 may be provided as a feedback input to signal input port 122 of adaptation module 100. Adaptation module 100 may be configured to compare an a priori known stored version of data signal 101-1 after modulation and filtering for comparison with feedback of TX input signal 333 to detect errors between them, which may be for an a priori known data pattern, a predetermined or default modulation, and a predetermined or default filter setting.

FIG. 3-3 is a block diagram depicting an exemplary optical transmitter 300 having a common adaptation module 100. Optical transmitter 300 may have a plurality of transmitter units 301 for communication via optical channels. In this example, optical transmitter 300 has transmitter units 301-1 and 301-2. In other examples, more than two transmitter units 301 may be present. In this example, each transmitter unit 301 shares an external adaptation module 100.

Again, electrical input data signals 101-1 and 101-2 are respectively input to transmitter units 301-1 and 301-2 to obtain optical output data signals 311-1 and 311-2 respectively therefrom. Optical output data signals 311-1 and 311-2 may be input to an optical combiner 310 to output an optical multi-waveform signal 312 as an overall output of optical transmitter 300. Optical multi-waveform signal 312 may be provided to an optical transmission medium, such as a channel of an optical fiber for example, as described below in additional detail.

Each of transmitter units 301-1 and 301-2 provide their respective electrical input data signals 101-1 and 101-2 to a shared or common adaptation module 100, and to a respective modulator 302. Each transmitter unit 301-1 and 301-2 includes a modulator 302, a shaping filter 303, an electrical-to-optical signal TX 304, and an optical-to-electrical signal RX 305, and transmitter units 301-1 and 301-2 share an adaptation module 100.

In an implementation, adaptation module 100 may be located on a die separate from one or more dies associated with transmitter units 301-1 and 301-2, such as an FPGA implementation of adaptation module 100 due to its programmability for example. One or more of transmitter units 301-1 and 301-2 and adaptation module 100 may all be packaged in a same package, such as for example a stacked-silicon interposer technology, where dies are all coupled to one another through an interposer die (not shown). Transmitter units 301 may have other components, as known, which are not illustratively depicted or described herein for purposes of clarity and not limitation.

The above-description with reference to FIGS. 3-1 and 3-2 equally applies to optical transmitter 300 of FIG. 3-3, except for the following differences with respect to a common adaptation module 100. A common adaptation module 100 may be coupled to receive electrical data signals 101-1 and 101-2, as well as corresponding data signals 102-1 and 102-2 respectively from an optical-to-electrical signal RX 305 of each of transmitter units 301-1 and 301-2. Adaptation module 100 may be configured to compare data signals 101-1 and 101-2 to corresponding data signals 102-1 and 102-2 to generate respective sets of adjustment information. Along those lines, either or both of adjustment information 106S-1 and 106M-1 may be respectively provided to modulator 302 and shaping filter 303 of transmitter unit 301-1 responsive to a comparison between data signals 101-1 and 102-1. Moreover, either or both of adjustment information 106S-2 and 106M-2 may be respectively provided to modulator 302 and shaping filter 303 of transmitter unit 301-2 responsive to a comparison between data signals 101-2 and 102-2.

Figure 4:
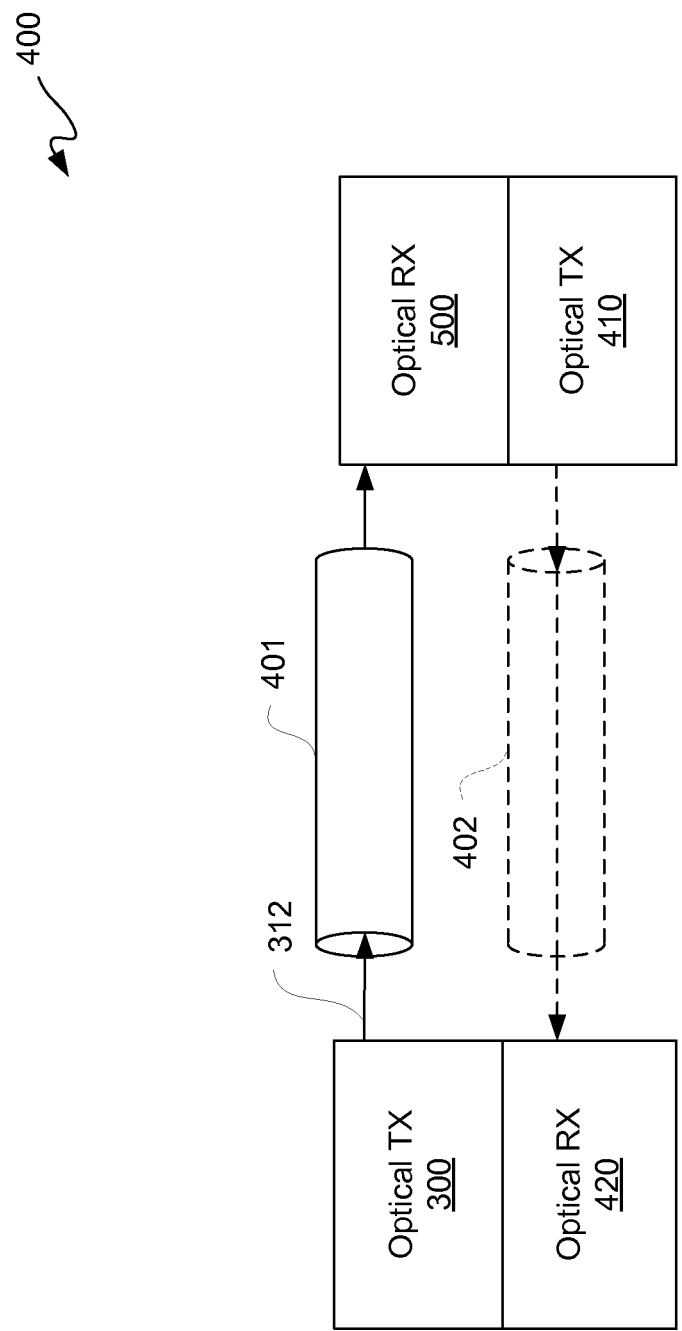
FIG. 4 is a block diagram depicting an exemplary communication system for communication over an optical channel.

FIG. 4 is a block diagram depicting an exemplary communication system 400 for communication via one or more optical channels. Communication system 400 includes an optical TX 300 coupled for communication with an optical RX 500. An optical transmission medium 401 may be used to couple optical TX 300 with optical RX 500 for communication of optical multi-waveform signal 312. Optical transmission medium 401 may be an optical fiber or optical fibers representing one or more channels of communication. Optical transmission medium 401 may be for single mode, multi-mode, or other modality. As optical transmission is generally only one-way, another transmission medium 402 from an optical TX 410 to an optical RX 420 is illustratively depicted to indicate an optional back channel for communication. Such back channel may be for optical signaling, electrical wired signaling, wireless signaling, or a combination thereof. Along those lines, for example, optical RX 500 may be coupled to optical TX 410 for communication of refinement information via a back channel over transmission medium 402 to optical RX 420. Optical RX 420 may be coupled to an adaptation module 100 of optical TX 300 to provide such refinement information thereto to refine pre-compensation, as previously described, by adjustment information provided by such adaptation module 100. Optical TX 410 and optical RX 420 may be conventional, and so are not described in unnecessary detail.

Figures 1, 5:
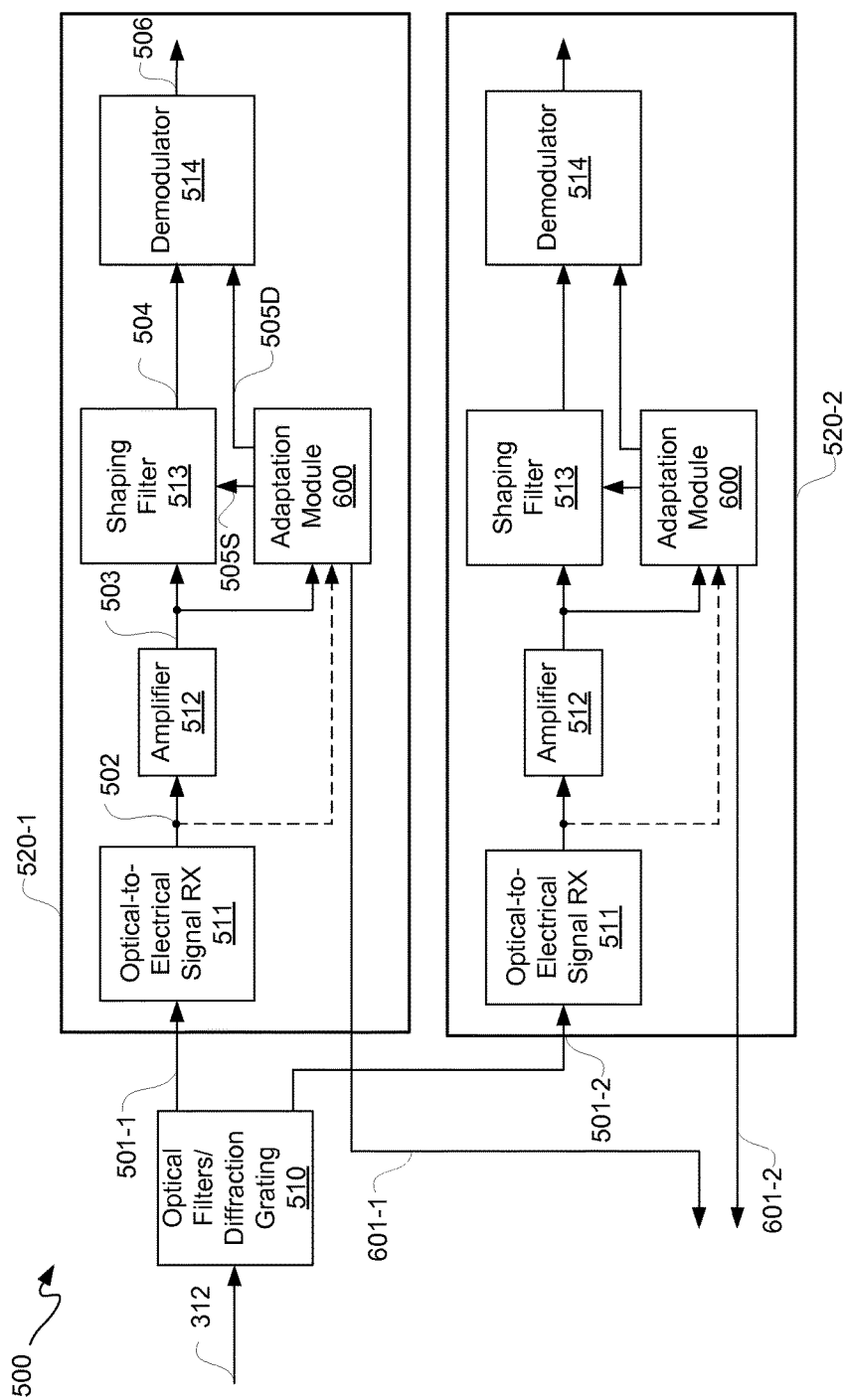
Figures 2, 5:
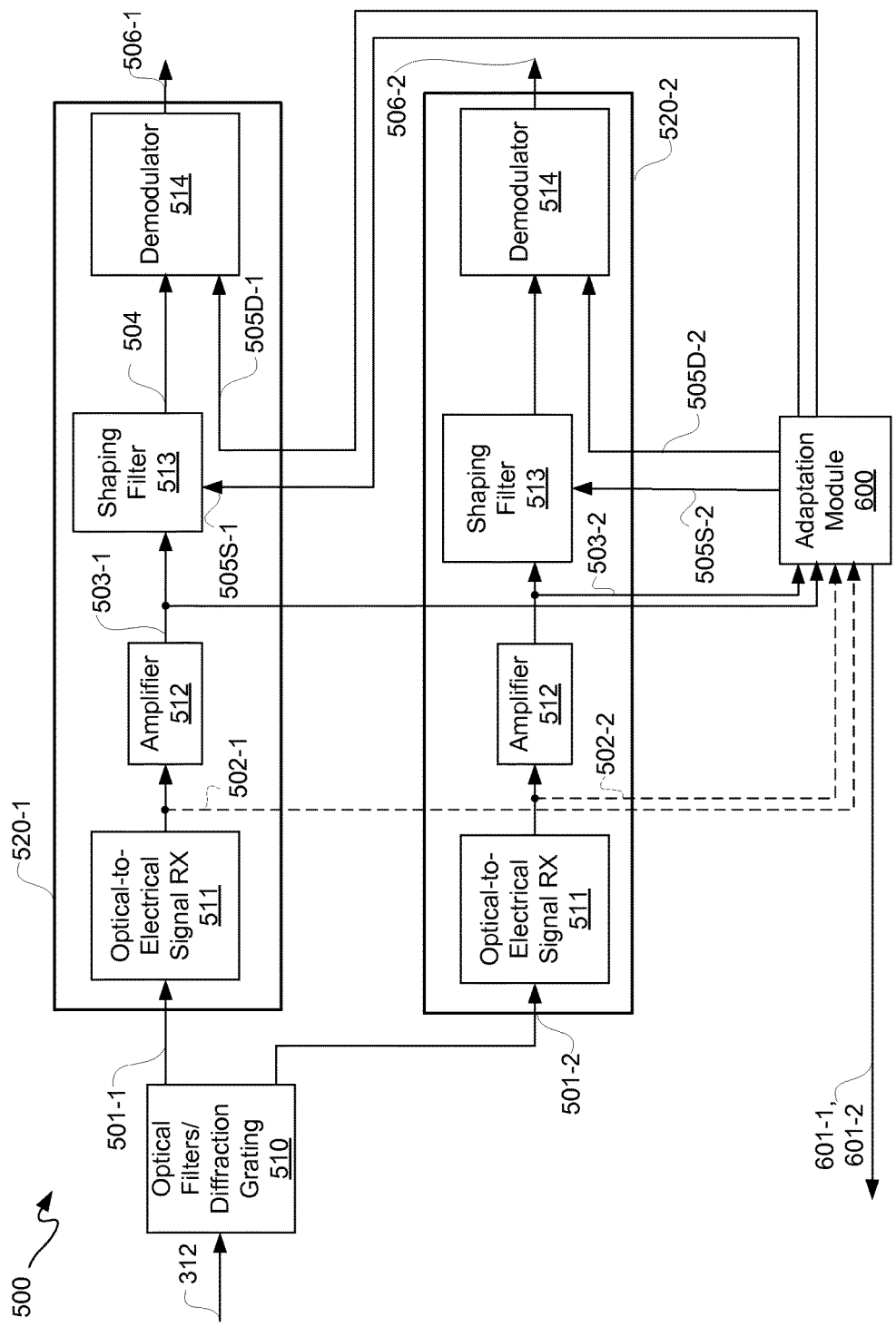

FIG. 5-1 is a block diagram depicting an exemplary optical RX 500 coupled to receive an optical multi-waveform signal 312 via an optical channel after being parsed out into wavelengths by optical filters/diffraction grating 510. A plurality of optical filters and/or a diffraction grating may be used to parse out optical multi-waveform signal 312 into waveform signals 501-1 and 501-2, or more than two waveforms depending on the number of wavelengths used in optical multi-waveform signal 312.

Waveform signals 501-1 and 501-2 are respectively provided to corresponding receiver units 520-1 and 520-2 of optical RX 500. As receiver units 520-1 and 520-2 are generally the same, only receiver unit 520-1 is further described for purposes of clarity and not limitation.

Receiver unit 520-1 includes an optical-to-electrical signal RX 511 configured to convert waveform signal 501-1 from an optical signal to an electrical data input signal 502. Optical-to-electrical signal RX 511 may be a photo diode or other optical-to-electrical signal converter.

An amplifier 512, and optionally an adaptation module 600, of receiver unit 520-1 may be coupled to receive data input signal 502. An amplified signal 503, which is an amplified version of data input signal 502, may be output from amplifier 512 for input to shaping filter 513 and adaptation module 600 of receiver unit 520-1. In this example, amplifier 512 may be a trans-impedance amplifier, namely generally an amplifier that converts current to voltage for such amplification.

A filter shaped output 504 may be output from shaping filter 513 for input to demodulator 514 of receiver unit 520-1. Demodulator 514 may demodulate amplified-filter shaped signal 504 to provide a demodulated data output signal 506. Demodulator 514 may be for demodulation of any of a variety of codes, including without limitation the example of a 4 QAM modulation. Thus, for example data output signal 506 may be converted from a 4 QAM constellation in the frequency domain with some distortion thereof to a corresponding time domain signal.

Adaptation module 600 may be loaded with a priori information about data input signal 502 for comparison with amplified signal 503. Thus, adaptation module 600 may be loaded with a priori information about how a received data input signal 502 should appear after being amplified into amplified signal 503. Optionally, adaptation module 600 may be loaded with a priori information about data input signal 502 before and after amplification, and thus respective comparisons with such loaded information and received data input signal 502 and amplified signal 503 may be made to generate one or more transforms, as described below in additional detail. Such a priori information may be pre-loaded into adaptation module 600 or may be sent by optical transmitter 300 or a combination thereof.

Adaptation module 600 may be configured to compare loaded a priori information with a received data input signal 502 and/or amplified signal 503 to generate either or both adjustment information 505S and adjustment information 505D. Adjustment information 505S and adjustment information 505D may be respectively for shaping filter 513 and demodulator 514, where shaping filter 513 and/or demodulator 514 may be signal programmed to be adjusted.

Shaping filter 513 may be the same as or similar to shaping filter 303, as previously described with reference to FIGS. 3-1 through 3-3. However, where shaping filter 303 may for pre-compensation adaptive filtering, shaping filter 513 may be for post-compensation adaptive filtering, namely an adaptive filtering after compensation by a transmitter unit of optical transmitter 300 as previously described. However, in another system there may be no pre-compensation adaptive filtering prior to compensation by shaping filter 513.

In order to generate adjustment information 505S and/or 505D, adaptation module 600 may be configured to determine at least one transform for data input signal 502 and/or amplified signal 503 regarding distortion thereof by a comparison to a predetermined reference loaded therein. Along those lines, a known pattern and/or format may be used, and data input signal 502 and/or amplified signal 503 representing such known pattern may have some distortion away from such corresponding known pattern and/or format. Such transform or transforms may provide information regarding spectral components of data input signal 502 and/or amplified signal 503 including amplitude, phase, frequency, and/or timing information. Such transform or transforms may indicate distortion of a transmitted waveform signal 501-1 as compared with such signal originally transmitted, for example as output data signals 311-1 of FIGS. 3-1 through 3-3. From such one or more transforms, adjustment information 505S and/or 505D may be generated and respectively provided to shaping filter 513 and/or demodulator 514 to respectively condition either or both of those devices to mitigate against such distortion.

Optionally, information obtained by adaptation module 600 may be communicated to a corresponding transmitter unit of optical transmitter 300 as refinement information 601-1. For example, receiver units 520-1 and 520-2 may provide corresponding refinement information 601-1 and 601-2 to optical TX 410 of FIG. 4 for transmission, as previously described, to a common adaptation module 100 or corresponding adaptation modules 100 of optical TX 300.

FIG. 5-2 is a block diagram depicting another exemplary optical RX 500 coupled to receive an optical multi-waveform signal 312 having a common adaptation module 600. Optical RX 500 may have a plurality of receiver units 520. In this example, optical RX 500 has receiver units 520-1 and 520-2. In other examples, more than two receiver units 520 may be present. In this example, each receiver unit 520 shares an external adaptation module 600. Adaptation module 600 may be for a receiver side of an optical communication channel.

Optical input data signals 501-1 and 501-2 are respectively input to receiver units 520-1 and 520-2 to obtain electrical output data signals 506-1 and 506-2 respectively therefrom. Electrical output data signals 506-1 and 506-2 may be input to other circuitry as an overall output from optical receiver 500.

Each receiver unit 520-1 and 520-2 includes a demodulator 514, a shaping filter 513, an amplifier 512, and an optical-to-electrical signal RX 511, and receiver units 520-1 and 520-2 share an adaptation module 600. Each of receiver units 520-1 and 520-2 optionally provide their respective electrical data input signals 502-1 and 502-2 and/or provide their respective electrical amplified signals 503-1 and 503-2 to a shared or common adaptation module 600.

In an implementation, adaptation module 600 may be located on a die separate from one or more dies associated with receiver units 520-1 and 520-2, such as an FPGA implementation of adaptation module 600 due to its programmability for example. One or more of receiver units 520-1 and 520-2 and adaptation module 600, as well as optical filters/diffraction grating 510, may all be packaged in a same package, such as for example a stacked-silicon interposer technology, where dies are all coupled to one another through an interposer die (not shown). Receiver units 520 may have other components, as known, which are not illustratively depicted or described herein for purposes of clarity and not limitation.

Adaptation module 600 may be configured to compare data signals 502-1 and 502-2 to corresponding a priori information loaded into adaptation module 600 to generate respective sets of adjustment information. Along those lines, either or both of adjustment information 505S-1 and 505D-1 may be generated by a comparison of input data signal 502-1 and/or amplified signal 503-1 and a priori information therefor for respectively providing to shaping filter 513 and demodulator 514 of receiver unit 520-1. Moreover, either or both adjustment information 505S-2 and 505D-2 may be generated by a comparison of input data signal 502-2 and/or amplified signal 503-2 and a priori information therefor for respectively providing to shaping filter 513 and demodulator 514 of receiver unit 520-2.

Refinement information 601-1 and 601-2 for setting or refining settings of an optical TX 300 may be sent from adaptation module 600 to such an optical TX 300, as previously described via a back channel. In an implementation, shaping filter 513 may be eliminated for directly coupling amplifier 512 to demodulator 514. In such an implementation, all information determined at a receiver unit 520 may be sent to a corresponding transmitter unit 301 for setting such transmitter unit. In yet another implementation, a portion of an adjustment may be performed at a receiver unit and another portion of such an adjustment may be performed at a corresponding transmitter unit. For example, a shaping filter 303 of a transmitter unit 301-1 may perform a portion of a distortion reduction adjustment (e.g., such as a $\sqrt{2}$ portion), and a shaping filter 513 of a corresponding receiver unit 520-1 may perform another portion of a distortion reduction adjustment (e.g., such as another $\sqrt{2}$ portion). In other words, a square root of two is half of a filter response, so once signal is passed through both an adjusted shaping filter 303 and an adjusted shaping filter 513, a target response may be obtained at an optical RX 500.

Optionally, it may be that distortion associated for example with data signals 502-1 and 502-2, or respectively amplified versions thereof, is sufficiently equivalent with respect to outputs from a common optical multi-waveform signal 312 parsed-out from a common optical filters/diffraction grating 510 block so as to use one receiver unit 520 as a reference for all corresponding receiver units coupled to optical filters/diffraction grating 510. Along those lines, adaptation module 600 may be respectively coupled to each receiver unit 520-1 and 520-2 to provide adjustment information respectively thereto, as previously described, where such adjustment information is generate from signaling provided from either receiver unit 520-1 and 520-2. Thus for example, either or both of signals 502-1 and 503-1 may be provided to a common adaptation module 600 to generate adjustment information in the form of signals 505S-1, 505S-2, 505D-1 and/or 505D-2 for respectively providing such adjustment information as previously described.

Figure 6:
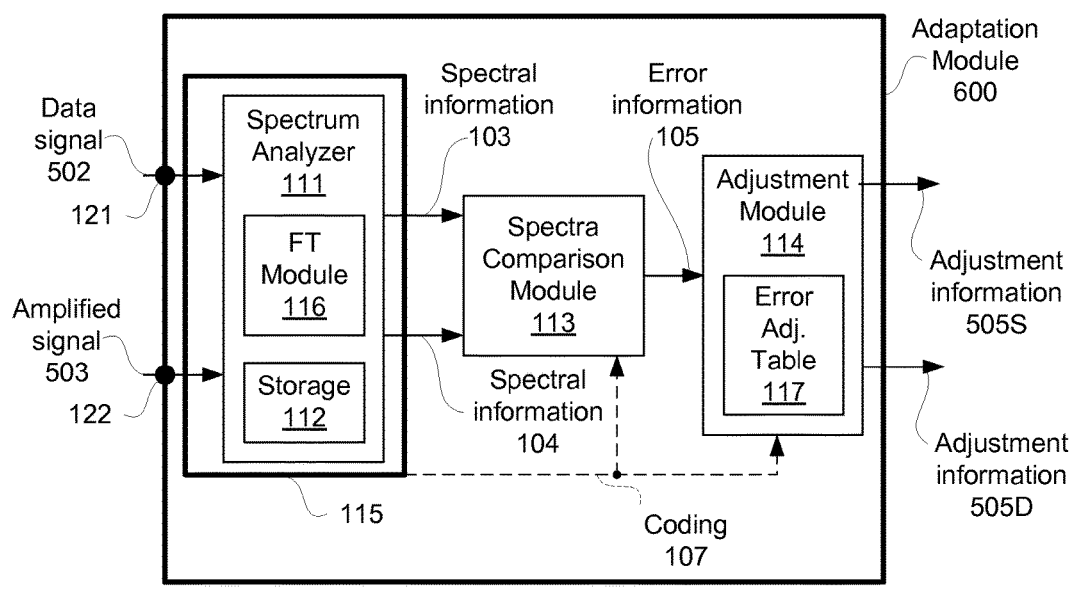
FIG. 6 is a block diagram depicting an exemplary adaptation module for reception.

FIG. 6 is a block diagram depicting an exemplary adaptation module 600 for reception. Adaptation module 600 may be used for channel adaptive post-transmission compensation ("post-compensation) for an optical communications channel.

Adaptation module 600 includes a signal input port 121 to receive a data signal 502 and a signal input port 122 to receive a data signal 503. Data signal 502 and thus amplified signal 503 may be a set of predetermined reference data to provide a priori information for loading and for subsequent comparison with another set of data received. Thus, a later instance of data signal 502 or amplified signal 503 may be received data for comparison against such a priori set of information loaded in storage 112. Optionally, such predetermined reference data may be loaded through a back channel and/or directly loaded from a control interface to storage 112 of adaptation module 600.

Adaptation module 600 includes an analysis module 115 coupled to generate spectral information 103 for data signal 502 and/or amplified signal 503 and coupled to generate corresponding spectral information 104 from such a priori set of information loaded in storage 112. Spectrum analyzer 111 may include an FT module 116 and spectrum analyzer data storage 112. Spectrum analyzer data storage 112 may include registers and/or memory for storing such a priori set of information for generation of spectral information 104 for output to spectra comparison module 113 for comparison. Optionally, spectral information 104 may be directly loaded into storage 112 for subsequent output without having to be converted, as previously described.

Such spectral information 103 and 104 may include one or more of amplitude information, phase information, and frequency information, including without limitation timing information associated with phase and/or frequency information. In this example, spectrum analysis module 115 includes a spectrum analyzer 111, where spectrum analyzer 111 includes spectrum analyzer data storage 112 and at least one FT module 116. An FT module 116 may be for performing one or more Fourier Transforms to obtain frequency components of data signal 502 and/or amplified signal 503, as well as their corresponding sets of a priori information in storage 112.

Additionally, spectrum analyzer 111 may include any of a number of other modules for obtaining other types of spectral information. Spectral information 103 and 104 may be for any of a variety of types of coding, including without limitation quadrature-phase-shift-keying, pulse-amplitude modulation, or QAM, among others. Optionally, an indication of the type of coding being used may be provided to adaptation module 600 as part of such a priori set of information loaded in storage 112. For purposes of clarity by way of example and not limitation, it shall be assumed that data signal 502 has a 4-point constellation for a 4 QAM configuration; however, this or other types of coding may be used, and this or other constellations may be used. Thus, for example an indication that 4 QAM is in use may be provided to any one or more of modules 113 and 114 of adaptation module 600 via a coding signal 107 from spectrum analysis module 115 based on such a priori set of information loaded in storage 112.

Adaptation module 600 includes spectra comparison module 113 coupled to compare spectral information 103 and spectral information 104 to provide error information 105. For example, a comparison of data for a 4 QAM of data signal 502 and/or amplified signal 503 with that of a set of stored reference data respectively therefor may reveal amplitude, phase and/or frequency differences. One, some, or all of these differences may be conveyed as error information 105 to indicate how much data signal 502 and/or amplified signal 503 is distorted with respect to such corresponding reference data.

Adaptation module 600 includes an adjustment module 114 coupled to receive error information 105 to provide adjustment information 505S and/or 505D at a signal output port. In this configuration, adjustment module 114 includes an error adjustment table 117. Error adjustment table 117 may store sets of adjustment information for output as adjustment information 505S and/or 505D in a tabularized format. Error information 105 may provide pointers into error adjustment table 117 to obtain settings to correct for errors indicated in error information 105, and pointed to settings may be output as adjustment information 505S and/or 505D. Such settings may be different for different types of coding.

Along those lines, coding signal 107 may be used as a filter pointer to select which grouping of settings to select for output as adjustment information 505S and/or 505D. Adjustment information 505S and/or 505D may compensate for one or more errors revealed by error information 105. As described above in additional detail, adjustment information 505S and/or 505D may be provided in various forms, including without limitation for post-compensation adaptive filtering and/or demodulating in a receiver unit 501.

Figure 7:
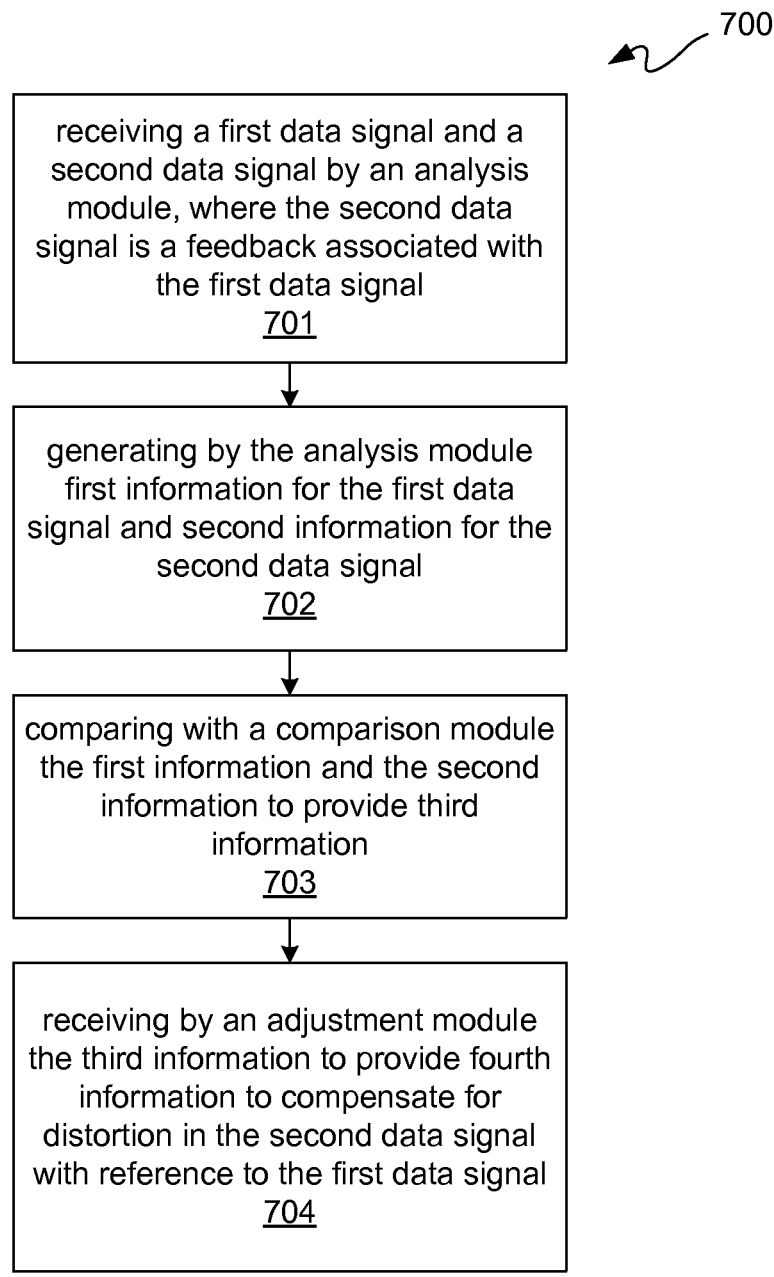
FIG. 7 is a flow diagram depicting an exemplary distortion compensation flow.

FIG. 7 is a flow diagram depicting an exemplary distortion compensation flow 700, such as for example an adaptation module 100 of FIG. 1-1 or 1-2 of an optical transmitter 300 of any of FIGS. 3-1 through 3-3. Distortion compensation flow 700 is further described with simultaneous reference to FIGS. 1-1, 1-2, and 3-1 through 3-3.

At 701, an analysis module, such as for example spectrum analysis module or a signal analysis module 115, receives a first data signal, such as data signal 101, and a second data, such as data signal 102. Again, data signal 102 is a fed back signal associated with data signal 101.

At 702, spectrum analysis module 115 may provide first information, such as spectral information 103, for such data signal 101, and second information, such as spectral information 104, for such data signal 102. For a signal analysis module 115, such first information may be error information 172 and such second information may be a threshold channel error rate signal 173, which may or may not originate from a user setting in signal analyzer 171.

At 703, a comparison module, such as for example spectra comparison module 113 for a spectrum analyzer 111 or a comparison module 174 for a signal analyzer 171, compares such first information and such second information to provide third information. Such third information may be error information 105 from spectra comparison module 113 or pointer information 175 from comparison module 174. At 704, an adjustment module, such as an adjustment module 114 coupled to receive error information 105 or an adjustment module 176 coupled to receive pointer information 175, receives such third information to provide fourth information, such as adjustment information 106, to compensate for distortion in such data signal 102 with reference to such data signal 101.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A system for pre-optical channel adaptive compensation, comprising:
   an adaptation module; and
   first and second transmitters coupled to an optical combiner, each of the first and second transmitters comprising:
   a modulator coupled to the adaptation module and configured to receive a first data signal;
   a shaping filter coupled to the modulator;
   a first signal converter coupled to the shaping filter, the first signal converter being an electrical-to-optical signal converter;
   a second signal converter coupled to the first signal converter, the second signal converter being an optical-to-electrical converter; and
   a feedback loop having the modulator, the shaping filter, the first signal converter, the second signal converter, and the adaptation module to provide a second data signal via the second signal converter after output from the first signal converter for input to the adaptation module as a fed back version of the first data signal during a conversion of the first data signal to an optical signal for communication via an optical channel;
   wherein the adaptation module is configured to receive both the first data signal of the first transmitter and the first data signal of the second transmitter; and
   wherein the adaptation module is configured with an error adjustment table having adjustment information including change settings for at least one of the shaping filter or the modulator in each of the first and second transmitters to respectively adjust the shaping filter or the modulator in the first transmitter to compensate for distortion in the second data signal of the first transmitter with reference to the first data signal of the first transmitter, and the shaping filter or the modulator in the second transmitter to compensate for distortion in the second data signal of the second transmitter with reference to the first data signal of the second transmitter.

2. The system according to claim 1, wherein the adaptation module is coupled to provide the adjustment information to the shaping filter to adjust the shaping filter to compensate for distortion in the second data signal of the first transmitter with reference to the first data signal of the first transmitter and the second data signal of the second transmitter with reference to the first data signal of the second transmitter.

3. The system according to claim 2, wherein the adaptation module is coupled to receive a shaped-filtered output from the shaping filter compensated for the distortion in the second data signal the first transmitter and the second data of the second transmitter.

4. The system according to claim 1, wherein the optical combiner is coupled to receive output from each of the first electrical-to-optical signal converter and the second electrical-to-optical signal converter from each of the first and second transmitters for combination thereof for output onto the optical channel.

5. The system according to claim 1, wherein the adaptation module comprises:
   an analysis module configured to receive the first data signal and the second data signal from the first transmitter, and the first data signal and the second data signal from the second transmitter, and to provide first data and second data respectively responsive to the first data signal of the first transmitter and the first data signal of the second transmitter and the second data signal of the first transmitter and the second data signal of the second transmitter;
   a comparison module configured to receive and compare the first data and the second data and to generate comparison information responsive to comparison between the first data and the second data;
   an adjustment module configured to receive the comparison information and generate the adjustment information to compensate for distortion in the second data signal with reference to the first data signal of the first transmitter and the first data signal of the second transmitter; and
   the second data signal of the first transmitter is associated with a conversion of the first data signal of the first transmitter to a first optical signal for communication via the optical channel;
   the second data signal of the second transmitter is associated with a conversion of the first data signal of the second transmitter to a second optical signal for communication via the optical channel.

6. The system according to claim 5, wherein the analysis module is a spectrum analysis module configured to generate the first data for the first data signal of the first transmitter and the first data signal of the second transmitter, and the second data for the second data signal of the first transmitter and the second data signal of the second transmitter.

7. The system according to claim 6, wherein:
   the spectrum analysis module includes a spectrum analyzer; and
   the first data and the second data respectively are first spectral data and second spectral data output from the spectrum analyzer.

8. The system according to claim 7, wherein:
   the comparison module is a spectra comparison module; and
   the comparison information is error information responsive to differences in the second data with respect to the first data.

9. The system according to claim 8, wherein:
   the analysis module includes a signal analyzer configured to generate error data as the first data;
   the analysis module is configured to store reference information associated with the first data signal and the second data signal of the first transmitter, and the first data signal and the second data signal of the second transmitter, to generate the error information;
   the second data is threshold data;
   the comparison module is configured to compare the error information with threshold data to provide pointer information as the comparison information; and
   the adjustment module is configured to receive the pointer information to generate the adjustment information to compensate for the distortion.

10. A system for pre-optical channel adaptive compensation, comprising:
    an adaptation module; and
    first and second transmitters coupled to an optical combiner, each of the first and second transmitters comprising:
      a modulator coupled to the adaptation module and configured to receive a first data signal;
      a shaping filter coupled to the modulator;
      a first signal converter coupled to the shaping filter, the first signal converter being an electrical-to-optical converter;
      a second signal converter coupled to the first signal converter, the second signal converter being an optical-to-electrical converter; and
      a feedback loop having the modulator, the shaping filter, the first signal converter, the second signal converter, and the adaptation module configured to provide a second data signal via the second signal converter after output from the first signal converter for input to the adaptation module as a fed back version of the first data signal;
    wherein the adaptation module is configured to receiver both the first data signal of the first transmitter and the first data signal of the second transmitter; and
    wherein the adaptation module is configured with an error adjustment table having adjustment information including change settings for the modulator in each of the first and second transmitters to adjust the modulator in the first transmitter to compensate for distortion in the second data signal of the first transmitter with reference to the first data signal of the first transmitter, and the modulator in the second transmitter to compensate for distortion in the second data signal of the second transmitter with reference to the first data signal of the second transmitter.

11. The system according to claim 10, wherein the adaptation module is coupled to receive a modulated output from the modulator in each of the first and second transmitters compensated for the distortion in the second data signal.

* * * * *